US012759571B2

(12) United States Patent
Brandstetter

(10) Patent No.: US 12,759,571 B2
(45) Date of Patent: Oct. 13, 2026

(54) METHOD AND DRIVING DEVICE FOR PERFORMING AN AUTOMATED DRIVING MANEUVER

(71) Applicant: Bayerische Motoren Werke Aktiengesellschaft, Munich (DE)

(72) Inventor: Manfred Brandstetter, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1 day.

(21) Appl. No.: 19/036,961

(22) Filed: Jan. 24, 2025

(65) Prior Publication Data

US 2025/0242821 A1 Jul. 31, 2025

(30) Foreign Application Priority Data

Jan. 26, 2024 (DE) ..................... 10 2024 102 282.5

(51) Int. Cl.
*B60W 50/10* (2012.01)

(52) U.S. Cl.
CPC ..... *B60W 50/10* (2013.01); *B60W 2510/1005* (2013.01); *B60W 2510/18* (2013.01); *B60W 2540/20* (2013.01); *B60W 2720/24* (2013.01)

(58) Field of Classification Search
CPC ......... B60W 50/10; B60W 2510/1005; B60W 2510/18; B60W 2540/20; B60W 2720/24;
(Continued)

(56) References Cited

U.S. PATENT DOCUMENTS

2014/0066251 A1* 3/2014 Kawamoto ............ B60W 10/11 180/65.265
2014/0343830 A1* 11/2014 Elwart ................ F02N 11/0837 701/112
(Continued)

FOREIGN PATENT DOCUMENTS

DE 102006047461 A1 * 4/2008 ......... B62D 15/0285
DE 10 2009 010 006 A1 10/2009
(Continued)

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).
(Continued)

*Primary Examiner* — Khoi H Tran
*Assistant Examiner* — Tristan J Greiner
(74) *Attorney, Agent, or Firm* — Crowell & Moring LLP

(57) ABSTRACT

A driving device for performing an automated driving maneuver in a motor vehicle is disclosed. The driving device is configured to guide the motor vehicle along an original trajectory in an automated manner in order to perform the driving maneuver and, while performing the driving maneuver, to detect a user input which indicates that a change of direction of travel is to be performed. The driving device is further configured to cause a change of direction in response to the user input at an intermediate position and, starting from the intermediate position, to determine a trajectory for the driving maneuver adjusted with regard to the original trajectory, and to guide the motor vehicle in an automated manner along the adjusted trajectory to continue the driving maneuver.

10 Claims, 2 Drawing Sheets

(58) Field of Classification Search
CPC ........... B60W 30/06; B60W 30/18163; B60W 60/001; B60W 60/0053; B60W 2540/10; B60W 2540/12; B60W 2540/16
See application file for complete search history.

(56) References Cited

U.S. PATENT DOCUMENTS

| | | | | |
|---|---|---|---|---|
| 2017/0267238 | A1* | 9/2017 | Mimura | B60W 50/14 |
| 2018/0113457 | A1* | 4/2018 | Iagnemma | B60W 30/00 |
| 2018/0244287 | A1 | 8/2018 | Kirstein et al. | |
| 2018/0257665 | A1 | 9/2018 | Sannodo | |
| 2020/0130675 | A1* | 4/2020 | Hirata | B60W 30/06 |
| 2020/0231141 | A1* | 7/2020 | Edling | B60W 60/0011 |
| 2021/0300337 | A1* | 9/2021 | Fujitani | G08G 1/143 |

FOREIGN PATENT DOCUMENTS

| | | | |
|---|---|---|---|
| DE | 10 2015 215 918 | A1 | 2/2017 |
| DE | 10 2018 100 444 | A1 | 9/2018 |
| DE | 10 2018 206 933 | A1 | 11/2019 |
| DE | 10 2019 124 597 | A1 | 3/2021 |
| WO | WO 2019/080975 | A1 | 5/2019 |

OTHER PUBLICATIONS

German-language Office Action issued in German Application No. 10 2024 102 282.5 dated Oct. 4, 2024 (5 pages).
German-language Office Action issued in German Application No. 10 2024 102 282.5 dated Feb. 3, 2025 (5 pages).

* cited by examiner

METHOD AND DRIVING DEVICE FOR PERFORMING AN AUTOMATED DRIVING MANEUVER

CROSS REFERENCE TO RELATED APPLICATION

This application claims priority under 35 U.S.C. § 119 from German Patent Application No. 10 2024 102 282.5, filed Jan. 26, 2024, the entire disclosure of which is herein expressly incorporated by reference.

BACKGROUND AND SUMMARY

The invention relates to a method and a corresponding driving device for performing an automated driving maneuver in a motor vehicle.

A vehicle may include one or more driving systems, in particular driver assistance systems, which are each configured to guide the vehicle longitudinally and/or laterally in an automated manner. In particular, the vehicle may include a parking assistant which enables automated parking in a parking space and/or automated leaving of a parking space.

The travel trajectory used for an automated parking maneuver and more generally used for an automated driving maneuver may be perceived as unpleasant by the user of the vehicle, e.g. because the vehicle is guided relatively close to an obstacle or because the vehicle is guided over a ground threshold, in particular over a curb.

The present disclosure relates to the technical problem of increasing the comfort of a vehicle when performing an automated driving maneuver.

The technical problem is solved by each of the independent claims. Advantageous embodiments are described, inter alia, in the dependent claims. It is pointed out that additional features of a patent claim dependent on an independent patent claim without the features of the independent patent claim or only in combination with a subset of the features of the independent patent claim may form a separate invention independent of the combination of all features of the independent patent claim, which may be made the subject of an independent claim, a divisional application or a subsequent application. This also applies to technical principles described in the description, which may form an invention independent of the features of the independent patent claims.

According to one aspect, a driving device for performing a driving maneuver of a motor vehicle in an automated manner is disclosed. The driving maneuver may be a p maneuver entering a parking spot or a maneuver exiting a parking spot. The driving maneuver may be configured to guide the motor vehicle in an automated manner, in particular with automated longitudinal and lateral guidance, starting from a starting position to an end position. The end position may be located in a parking space, in particular in a parking spot, for the motor vehicle.

The driving device is configured to guide the motor vehicle in an automated manner (with automated longitudinal and lateral guidance) along an original trajectory in order to perform the driving maneuver (the original trajectory extending from the initial position to the end position). The original trajectory may have been determined based on sensor data from one or more environmental sensors (for example from one or more cameras, from one or more radar sensors, from one or more lidar sensors and/or from one or more ultrasonic sensors).

The driving device is further configured to detect a user input while performing the driving maneuver, which indicates that a change of direction of travel is to be performed. In particular, a user input may be detected which indicates that a change of direction of travel is to be performed differently from the original trajectory (in particular at a position that deviates from an original position specified within the original trajectory for a change of direction of travel).

It will be understood that the user, in particular the driver, of the motor vehicle has provided a user input while performing the driving maneuver, which indicates that the user wishes a change of direction of travel to be performed immediately while performing the driving maneuver (although the change of direction of travel to be performed immediately is not provided in the original trajectory (at least not at the same position)).

The driving device may be configured to detect an actuation of the gear selection control element (in particular the gear selection lever and/or the gear selection rocker) of the motor vehicle as a user input. The driving device may in particular be configured to detect, as user input, the deflection of a (moving) component, for example the (gear selection) lever and/or the gear selection rocker and/or a gear selection button, of the gear selection control element in a direction associated with a change of the direction of travel in relation to the current direction of travel of the motor vehicle. For example, a deflection of the (moving) component, such as the lever and/or the rocker and/or the button, may be detected, which is associated with the engagement of a forward gear when the motor vehicle is (currently) traveling in the reverse direction. On the other hand, a deflection of the (moving) component, for example the lever and/or the rocker and/or the button, may be detected, which is associated with the engagement of a reverse gear when the motor vehicle is (currently) traveling in the forward direction.

The motor vehicle may include an automatic transmission or a transmission with a fixed transmission ratio (as, for example, in a purely battery-electric vehicle). Alternatively or additionally, the motor vehicle may be configured in such a way that actuation of the gear selection control element, in particular the gear selection lever and/or the gear selection rocker and/or the gear selection button, may not directly result in a corresponding change in the gear of the motor vehicle transmission. The motor vehicle may, for example, have a so-called "shift-by-wire" function, so that, when the gear selection control element, in particular the gear selection lever and/or the gear selection rocker and/or the gear selection button, is actuated an electronic control signal (which does not directly result in a gear change). The user input for changing the direction of travel may be detected on the basis of the electronic control signal.

By using a (movable) component of the gear selection control element, in particular the gear selection lever and/or the gear selection rocker and/or the gear selection button, as the user input, a particularly convenient and intuitive intervention in the automated execution of the driving maneuver may be effected.

The driving device may be configured to detect, as a user input, an actuation of the brake pedal of the motor vehicle in addition to and in particular simultaneously with the actuation of the gear selection control element of the motor vehicle. By using a user input, which comprises the actuation of several control elements of the motor vehicle, a particularly reliable adjustment of the automated execution of the driving maneuver may be effected.

The driving device is further configured to cause a change of direction in response to the user input at an intermediate position. In particular, the driving device may be configured to cause (directly and/or immediately), in response to the user input, the motor vehicle to be automatically decelerated to a standstill and to come to a standstill in an intermediate position. In this case, the motor vehicle may optionally continue to be guided along the original trajectory to the intermediate position. Furthermore, the intermediate position may be arranged on the original trajectory. It may therefore possible, directly in response to the recognized user input, to automatically decelerate the motor vehicle (as quickly as possible) to be stopped, with the motor vehicle coming to a stop at an intermediate position, which depends on the time at which the user input was made. The change of direction of travel (with the associated gear change) may then be effected at the intermediate position or on the approach to the intermediate position (the latter typically leading to a deceleration of the motor vehicle). The change of the direction of travel may be effected at the same time as the user input or, if necessary, with a time delay compared to the user input. The time delay may depend on the speed of the motor vehicle when performing the driving maneuver (and typically increases with increasing travel speed).

The driving device is further configured to determine a trajectory for the driving maneuver starting from the intermediate position, which is adjusted with regard to the original trajectory. The motor vehicle may have been guided up to the intermediate position with a first direction of travel. The change of direction may be performed at the intermediate position or on the approach to the intermediate position. The adjusted trajectory may be determined in such a way that the motor vehicle is guided away from the intermediate position in the opposite second direction of travel. The first and the second direction of travel may be the forward direction and the backward direction, respectively. Alternatively, the first direction of travel may be the backward direction and the second direction of travel may be the forward direction.

As already explained above, the original trajectory may lead to the end position of the driving maneuver. The driving device may be configured (based on sensor data from the one or more environmental sensors) to determine an adjusted trajectory, which, starting from the intermediate position, leads to an adjusted end position, so that the adjusted end position is at most a predefined distance threshold value away from the end position of the original trajectory. The predefined distance threshold value may be 1 meter or less, in particular 50 cm or less, in particular 10 cm or less. It may therefore be possible to determine an adjusted trajectory which, taking into account the change of direction of travel at the intermediate position, leads to an adjusted end position which is as close as possible to the original end position of the original trajectory and is preferably identical to the original end position of the original trajectory.

Furthermore, the driving device is configured to guide the motor vehicle in an automated manner (laterally and longitudinally) along the adjusted trajectory in order to continue the driving maneuver. The driving maneuver may therefore be continued without interruption by performing a change of direction and an automated drive along the adjusted trajectory. In this way, the convenience and reliability of performing an automated driving maneuver may be increased.

The driving device may be configured to determine whether, starting from the intermediate position, an adjusted trajectory may be determined, which leads to an adjusted end position that is at most removed from the end position of the original trajectory by the predefined distance threshold value. As a further boundary condition, it may be required that the adjusted trajectory includes at most a maximum allowable number of driving maneuvers for the motor vehicle.

The driving device may further be configured to continue the driving maneuver along the adjusted trajectory if (possibly only if) an adjusted trajectory can be determined starting from the intermediate position. Alternatively or additionally, the driving device may be configured to abort the driving maneuver and, if necessary, to hold the motor vehicle in position at the intermediate position if no adjusted trajectory starting from the intermediate position can be determined. In this case, a corresponding message (regarding the termination of the driving maneuver) may be output via the user interface of the motor vehicle.

The driving maneuver may therefore be stopped if, no adjusted trajectory starting from the intermediate position can be determined, along which the motor vehicle may be guided sufficiently close to the original end position. In this way, the convenience and safety of performing an automated driving maneuver may be further increased.

The driving device may be configured to detect a subsequent user input following the user input, the subsequent user input e.g. comprising an actuation of the accelerator pedal of the motor vehicle, in particular the subsequent user input being an actuation of the accelerator pedal of the motor vehicle.

It may optionally be verified whether or not the subsequent user input has been made within a predefined time window after the user input (i.e. after the user input to request a change of direction of travel). The driving device may be configured to abort the driving maneuver and to hand over vehicle guidance to the user, in particular to the driver, of the motor vehicle if the subsequent user input has been made within the predefined time window after the user input. Alternatively or additionally, the driving device may be configured to abort the driving maneuver and stop the motor vehicle and/or to hold the motor vehicle in position if the subsequent user input is made following the predefined time window after the user input.

It may therefore possible for the user of the motor vehicle to end the driving maneuver through a subsequent user input and to assume control of the vehicle. In this way, the convenience and safety of performing a driving maneuver automatically may be further increased.

While performing the driving maneuver, the driving device may be configured to detect a user input which confirms the current direction of travel of the motor vehicle. The user input may e.g. include the deflection of the (moving) component of the gear selection control element of the motor vehicle, e.g. the (gear selection) lever and/or the (gear selection) rocker and/or the (gear selection) button, in a direction which is associated with the current direction of travel of the motor vehicle (and which therefore does not cause a change of direction of travel). The driving device may also be configured to abort the driving maneuver in response to the user input and to hand over the control of the vehicle to the user, in particular to the driver, of the motor vehicle. It may therefore be possible for the user of the motor vehicle to end the driving maneuver by user input on the (moving) component of the gear selection control element, in particular the gear selection lever and/or on the gear selection rocker and/or the gear selection button (optionally in combination with the actuation of the brake pedal) and to assume control of the vehicle. In this way, the convenience and safety of performing an automated driving maneuver may be further increased.

Alternatively or additionally, the driving device may be configured, in response to the detection of a user input which confirms the current direction of travel of the motor vehicle, to abort the driving maneuver and to stop the motor vehicle and/or to hold the motor vehicle in positon. In this way, a driving maneuver may be performed in a particularly safe manner.

The original trajectory may include one or more driving maneuvers (with directly consecutive driving maneuvers typically having different directions of travel). In particular, the original trajectory may have a specific original number of driving maneuvers. The original number may e.g. be 1 or more, 2 or more, or three or more. In a corresponding manner, the determined adjusted trajectory may have a specific adjusted number of driving maneuvers. The adjusted number of driving maneuvers may be the same as or different from the original number (in particular greater than the original number) of driving maneuvers. The measures described in the present disclosure may be performed for any driving maneuver of the original trajectory.

According to a further aspect, a (road) motor vehicle (in particular a passenger car, a truck, a bus or a motorcycle) is disclosed, which comprises the driving device described in the present disclosure.

According to a further aspect, a method for performing a driving maneuver of a motor vehicle in an automated manner is disclosed. The method comprises guiding the motor vehicle along an original trajectory in an automated manner to perform the driving maneuver and detecting, while performing the driving maneuver, a user input which indicates that a change of direction of travel (which is not provided for in the original trajectory) is to be performed (as part of the driving maneuver). The method further comprises effecting, in response to the user input, a change of the direction of travel at an intermediate position and determining, starting from the intermediate position, a trajectory for the driving maneuver adjusted with regard the original trajectory (which considers the change of the direction of travel at the intermediate position). The method further comprises guiding the motor vehicle in an automated manner to continue the driving maneuver along the adjusted trajectory.

It should be noted that the aspects disclosed with regard to the driving device, in particular the claims disclosed in connection with the driving device, are also applicable to the method as corresponding method features.

According to another aspect, a software (SW) program is disclosed. The SW program may be configured to be executed on a processor (for example on a vehicle control device) and thus to perform the method described in the present disclosure.

According to a further aspect, a storage medium is disclosed. The storage medium may include an SW program which is configured to be executed on a processor and thus to perform the method disclosed in the present disclosure.

For the purposes of the present disclosure, the term “automated driving” is understood to mean driving with automated longitudinal and/or lateral guidance. Automated driving may, for example, involve prolonged driving on the motorway or temporary driving as part of parking. The term “automated driving” comprises automated driving with any degree of automation. Examples of degrees of automation include assisted, partially automated, highly automated, fully automated and autonomous driving (each with an increasing degree of automation). The five degrees of automation mentioned above comply with SAE levels 1 to 5 of the SAE J3016 standard (SAE-Society of Automotive Engineering). In assisted driving (SAE level 1), the system performs longitudinal or lateral guidance in specific driving situations. In partially automated driving (SAE level 2), the system provides longitudinal and lateral guidance in certain driving situations, and the driver needs to constantly monitor the system, as with assisted driving. In highly automated driving (SAE level 3), the system provides longitudinal and lateral guidance in certain driving situations without the driver having to continuously monitor the system; however, within a certain period of time, the driver has to be able to assume control of the vehicle upon request by the system. In fully automated driving (SAE level 4), the system takes over control of the vehicle in certain driving situations, even if the driver does not respond to a request to intervene, so that the driver is omitted as a fallback level. In autonomous driving (SAE level 5), the system may perform all aspects of the dynamic driving task under any road and environmental conditions, which are typically controlled by a human driver. The driving device described in this document may be configured in accordance with SAE level 2 or higher.

It should be noted that the methods, devices and systems described in the present disclosure may be used alone or in combination with other methods, devices and systems described in the present disclosure. Furthermore, any aspect of the methods, devices and systems described in the present disclosure may be combined in a variety of ways. In particular, the features of the claims may be combined with one another in a variety of ways. Furthermore, features listed in brackets are to be understood as optional features.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
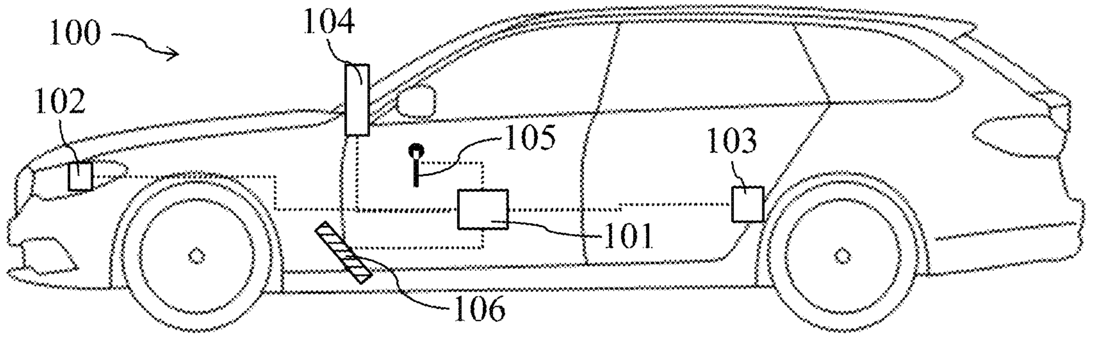
FIG. 1A shows exemplary components of a vehicle.

As explained above, the present disclosure relates to increasing the convenience of performing an automated driving maneuver of a vehicle. In this context, FIG. 1A shows an exemplary vehicle 100 with one or more environmental sensors 102, which are each configured to detect sensor data (which are also referred to as environmental data) relating to the environment of the vehicle 100. Examples of environmental sensors 102 are a camera, a radar sensor, a lidar sensor, an ultrasonic sensor, etc.

A (control) device 101 of the vehicle 100 may be configured to evaluate the environmental data, for example to recognize one or more objects (e.g. other vehicles) in the vicinity of the vehicle 100. The device 101 may also be configured to effect automated longitudinal and/or lateral guidance of the vehicle 100 on the basis of the environmental data, in particular based on the one or more detected objects. For this purpose, one or more longitudinal and/or transverse guidance actuators 103 of the vehicle 100 (e.g. a motor, a brake device and/or a steering device) may be controlled.

The vehicle 100 may also include a user interface 104, which enables a user of the vehicle 100 to interact with the vehicle 100, e.g. to start performing an automated driving maneuver.

Figure 2:
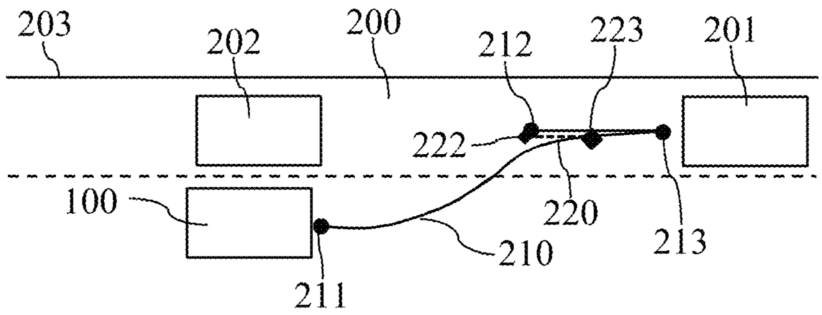
FIG. 2 shows an exemplary driving maneuver of the vehicle, in particular a driving maneuver entering a parking spot.

The device 101 (in particular a driving device of the vehicle 100) may be configured to effect an automated driving maneuver of the vehicle 100 (with automated longitudinal and lateral guidance of the vehicle 100) based on the environmental data from the one or more environmental sensors 102. As an example of a driving maneuver, FIG. 2 shows a parking maneuver of the vehicle 100 into a parking space 200, which is arranged between two obstacles 201, 202. The driving maneuver comprises a first phase, in which the vehicle 100 is guided in an automated manner in a first direction of travel (for example in the backward direction) starting from the initial position 211 along the trajectory 210 up to a stop position 213. The trajectory 210 may have been determined based on the environmental data from the one or more environmental sensors 102.

Furthermore, the driving maneuver comprises a second phase, in which the vehicle 100 is guided away from the stop position 213 in a second direction of travel in an automated manner (e.g. in the forward direction) along the trajectory 210 and is led to an end position 212. An automated change of the direction of travel from the first direction of travel to the second direction of travel may be effected at the stop position 213.

The driving maneuver may be effected in such a way that the vehicle 100 is automatically decelerated to a stop at the stop position 213. The gear change for changing the direction of travel (for example from reverse gear to forward gear) may be performed while the vehicle 100 is held in position at the stop position 213 (the vehicle 100 being held at in position e.g. by actuating a parking brake and/or by actuating one or more wheel brakes of the vehicle 100 and/or by an electric drive machine of the vehicle 100). Furthermore, the steering (for example the front wheel steering and/or the rear wheel steering) of the vehicle 100 may be actuated while the vehicle 100 is held in position at the stop position 213. In this case, one or more wheels of the vehicle 100 may be oriented along the trajectory 210 for subsequently driving along the trajectory 210.

The (original) trajectory 210 determined for the driving maneuver may be perceived as uncomfortable by the user of the vehicle 100, for example because the (original) trajectory 210 guides the vehicle 100 relatively close to an obstacle 201 or leads over a ground threshold 203 (for example over a curb). It is therefore possible for the user of the vehicle 100 to adjust the trajectory 210 used for the driving maneuver while performing the driving maneuver. In particular, it may be made possible for the user to change the direction of travel while driving along the (original) trajectory 210 by actuating an operating element 105 of the vehicle 100 without interrupting the execution of the driving maneuver.

Figure 1B:
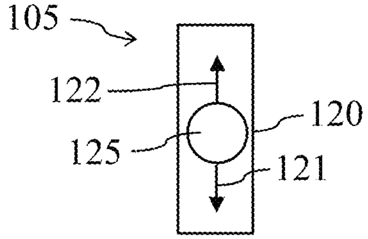
FIG. 1B shows an example of an operating element for effecting a change of the direction of travel.

FIG. 1B shows an example of an operating element 105 for effecting a change of direction while performing an automated driving maneuver. The operating element 105 may include a lever 125 (in particular the gear selection lever of the vehicle 100), which may be moved within an aisle 120 in a first direction 121 (for example backwards) or, alternatively, in an opposite second direction 122 (e.g. forward). It should be noted that, as an alternative or in addition to a lever 125, another (movable) input component may be provided to select a direction of travel, such as a rocker and/or a button. The aspects described in this document in connection with a lever 125 may be used accordingly for other (moving) input components, such as a rocker and/or a button.

The control element 105 may optionally be used during manual driving to adjust the gear of the (automatic) transmission of the vehicle 100. In this case, a deflection of the lever 125 in the first direction 121 and a deflection of the lever 125 in the second direction 122 may be associated with different directions of travel of the vehicle 100. The operating element 105, in particular the lever 125, may therefore be configured (during manual driving mode) to cause the vehicle 100 to change the direction of travel.

The (control) device 101 may be configured to detect an actuation of the operating element 105, in particular the lever 125, to cause a change of direction while performing the maneuver along the (original) trajectory 210 determined for the driving maneuver. In response to this, it may be caused the vehicle 100 to be automatically decelerated into a standstill. In the example shown in FIG. 2, the vehicle 100 comes to a standstill at an intermediate position 223. At intermediate position 223, the change of direction of travel (with a corresponding gear change, for example from a reverse gear to a forward gear, or vice versa) may be effected automatically.

The (control) device 101 may also be configured to determine an adjusted trajectory 220 for the driving maneuver, along which the vehicle 100 is guided starting at the intermediate position 223 to a (possibly adjusted) end position 222. In this case, the adjusted trajectory 220 may guide the motor vehicle 100 away from the intermediate position 223 in the changed direction of travel. If possible, the adjusted end position 222 is as close as possible to the original end position 212 of the original trajectory 210. In a preferred example, the adjusted end position 222 corresponds to the original end position 212.

In the example shown in FIG. 2, the actuation of the operating element 105 results in a change of direction of the vehicle 100 already at the intermediate position 223 instead of at the stop position 213, with the intermediate position 223 being farther away from the obstacle 201 than the stopping position 213. As a result, the comfort of the driving maneuver may be increased.

It is therefore possible for the user, in particular the driver, of the vehicle 100 to operate the gear selection control element 105 (for example a lever 125 or a switch) during the maneuver in order to effect a targeted gear change (when moving forward in the reverse direction (gear "R") or when driving backwards in the forward direction (gear "D")). Actuating the gear selection control element 105 may cause re-determining the trajectory 210, 220 of the driving maneuver.

It may be necessary for the user to press the brake pedal 106 of the vehicle 100 in addition to the gear selection control element 105 to ensure that the change of direction caused by the actuation of the gear selection control element 105 is actually intended by the user.

After the gear change, the (control) device 101 continues the automated driving maneuver (along the adjusted trajectory 220) without the need to actuate the accelerator pedal of the vehicle 100.

The (control) device 101 may be configured to detect one or more actions by the user of the vehicle 100, which cause the driving maneuver to be aborted. An exemplary action is the actuation of the brake pedal 106 and the (simultaneous) actuation of the gear selection control element 105 in the direction 121, 122 of the already engaged direction of travel and/or of the already engaged gear. This action by the user may result in the vehicle control being immediately taken over by the user and/or immediately being handed over to the user.

Another exemplary action is the actuation of the brake pedal 106 and the (simultaneous) actuation of the gear selection control element 105 in the opposite direction of travel and/or in the opposite gear. If the accelerator pedal of the vehicle 100 is also actuated (within a predefined, relatively short time window), this may cause the user of the vehicle 100 to take over control of the vehicle. If, on the other hand, no actuation of the accelerator pedal is effected, a change of direction when performing the driving maneuver and an adjustment of the trajectory 220 of the driving maneuver may be effected (as disclosed in the present disclosure).

Figure 3:
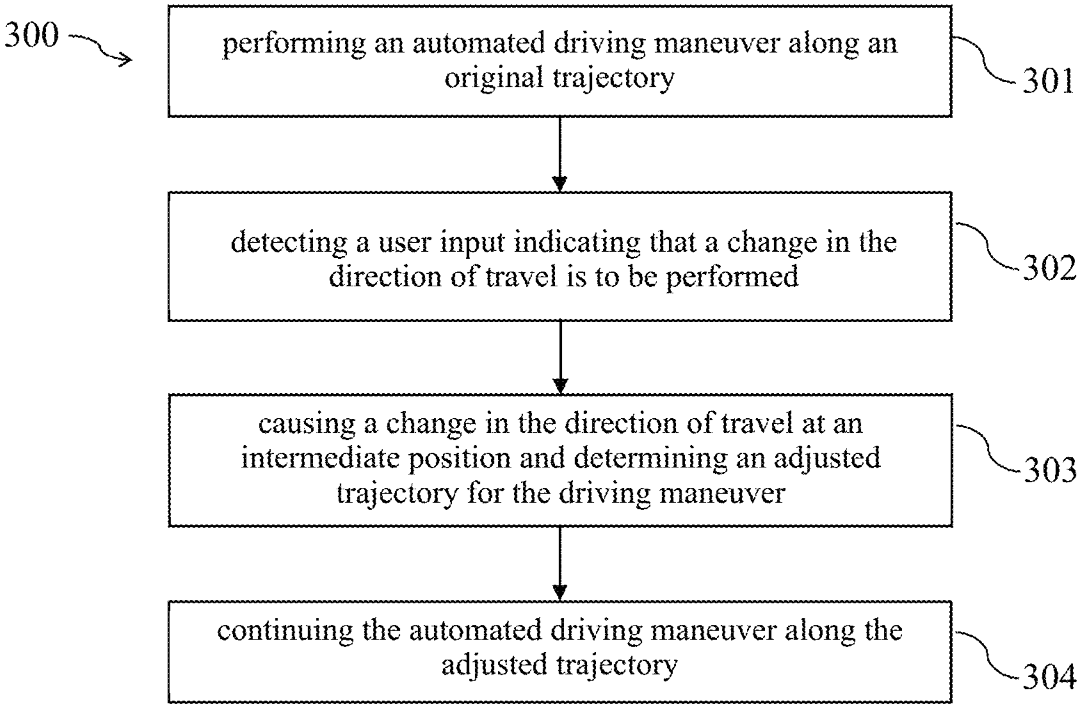
FIG. 3 is a flow chart of an exemplary method for performing an automated driving maneuver of a vehicle.

FIG. 3 shows a flow chart of an exemplary (possibly computer-implemented) method 300 for performing an automated driving maneuver of a motor vehicle 100. The automated driving maneuver may be configured to guide the motor vehicle 100 laterally and longitudinally in an automated manner, starting from an initial position 211 to an end position 212. The end position 212 may be arranged in a parking space 200 for the motor vehicle 100. The method 300 may be performed by a control and/or driving device 101 of the motor vehicle 100.

The method 300 comprises the automated (longitudinal and transverse) guidance 301 of the motor vehicle 100 to perform the driving maneuver along an original trajectory 210 (with the original trajectory 210 running, for example, from the initial position 211 to the end position 212). The original trajectory 211 may have been determined on the basis of environmental data from one or more environmental sensors 102 of the motor vehicle 100. The execution of the driving maneuver may have been initiated by the user, in particular by the driver, of the motor vehicle 100 via the user interface 104 of the motor vehicle 100.

The method 300 further comprises detecting 302, while performing the driving maneuver, of a user input which indicates that a change of direction of travel is to be performed. The user input may include the actuation of the gear selection lever 125 of the motor vehicle 100. In this case, the gear selection lever 125 (or a corresponding alternative control element such as a rocker or a button) may be deflected in a direction 121, 122, which is associated with a direction of travel that is opposite to the current direction of travel of the motor vehicle 100.

The method 300 further comprises effecting 303, in response to the user input, a change of the direction of travel at an intermediate position 223 and determining, starting from the intermediate position 223, a trajectory 220 for the driving maneuver adjusted with regard to the original trajectory 210. In particular, motor vehicle 100 may be caused to be decelerated to come to a stop at an intermediate position 223 immediately after the user input has been detected, wherein the intermediate position 223 may be located on the original trajectory 210. At (or on the approach to) the intermediate position 223, the change of direction of travel may be effected (by changing the transmission gear accordingly). In addition, an adjusted trajectory 220 may be determined, along which the motor vehicle 100 may be guided from the intermediate position 223 to an adjusted end position 222 (after performing the change of the direction of travel). In this case, the adjusted end position 222 is preferably as close as possible to the original end position 212 of the original trajectory 210.

The method 300 further comprises the automated (longitudinal and/or lateral) guidance 304 of the motor vehicle 100 to continue the driving maneuver along the adjusted trajectory 220 (up to the adjusted end position 222). The driving maneuver may then be continued without interruption and/or without the need for further user input.

The measures disclosed in the present disclosure may increase the comfort of a vehicle user when performing an automated driving maneuver in an efficient and reliable manner.

The present invention is not limited to the exemplary embodiments shown. In particular, it should be noted that the description and the figures are only intended to illustrate the principle of the proposed methods, devices and systems by way of example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving device for performing an automated parking maneuver of a motor vehicle, the driving device comprising:
- a computer implemented control unit configured to:
- guide the motor vehicle in an automated manner along an original trajectory to perform the parking maneuver at a desired parking location;
- detect a user input while performing the parking maneuver, which user input indicates that a change of direction of travel is to be performed;
- effect a change of direction in response to the user input at an intermediate position or on an approach to an intermediate position;
- determine an adjusted trajectory for the parking maneuver based on the intermediate position and adjusted to the original trajectory; and
- guide the motor vehicle along the adjusted trajectory in an automated manner to continue the parking maneuver, wherein
  - the original trajectory leads to an end position of the parking maneuver at the desired parking location,
  - the adjusted trajectory, starting from the intermediate position, leads to an adjusted end position of the parking maneuver at the desired parking location, and
  - a distance between the adjusted end position of the parking maneuver of the adjusted trajectory and the end position of the parking maneuver of the original trajectory is at most a predefined distance threshold value.

2. The driving device of claim 1, wherein the control unit is further configured to:
- determine whether, starting from the intermediate position, an adjusted trajectory is determinable which leads to an adjusted end position which is at most the predefined distance threshold value away from the end position of the original trajectory and which includes at most a maximum permitted number of driving maneuvers;
- continue the driving maneuver along the adjusted trajectory when the adjusted trajectory starting from the intermediate position is determinable; and
- abort the driving maneuver and keep the motor vehicle at the intermediate position when no adjusted trajectory starting from the intermediate position is determinable.

3. The driving device of claim 1, wherein the control unit is further configured to:

cause the motor vehicle to be decelerated in an automated manner to be stopped at the intermediate position in response to the user input, the motor vehicle being guided along the original trajectory to the intermediate position, wherein the intermediate position is arranged on the original trajectory.

4. The driving device of claim 1, wherein the control unit is further configured to:

detect an actuation of a gear selection control element of the motor vehicle as the user input.

5. The driving device of claim 4, wherein the control unit is further configured to:

detect a deflection of a moving component of the gear selection control element in a direction as the user input, which deflection is at least one of:

(i) associated with a change of direction of travel in relation to a current direction of travel of the motor vehicle, (ii) associated with engaging a forward gear when the motor vehicle is traveling in the reverse direction, or (iii) associated with engaging a reverse gear when the motor vehicle is traveling in the forward direction.

6. The driving device of claim 4, wherein the control unit is further configured to:

detect an actuation of a brake pedal of the motor vehicle in addition to an actuation of the gear selection control element of the motor vehicle as the user input.

7. The driving device of claim 1, wherein the control unit is further configured to:

detect a subsequent user input following the user input, the subsequent user input comprising an actuation of an accelerator pedal of the motor vehicle;

verify whether or not the subsequent user input was made within a predefined time window after the user input; and (i) abort the driving maneuver and hand over the vehicle control to a user of the motor vehicle if the subsequent user input has been made within the predefined time window after the user input, and/or (ii) abort the driving maneuver and stop the motor vehicle and/or hold the motor vehicle in position if the subsequent user input is made after the predefined time window following the user input.

8. The driving device of claim 1, wherein the control unit is further configured to:

detect a user input while performing the driving maneuver, which confirms a current direction of travel of the motor vehicle, the user input comprising a deflection of a moving component of a gear selection control element of the motor vehicle in a direction, which is associated with the current direction of travel of the motor vehicle; and abort the driving maneuver in response thereto; and hand over the vehicle control to a user of the motor vehicle; and/or stop the motor vehicle and/or to hold the motor vehicle in position.

9. The driving device of claim 8, wherein the moving component is a lever, a rocker, and/or a button.

10. A method for performing an automated driving maneuver of a motor vehicle, the method comprising:

guiding the motor vehicle in an automated manner to perform the driving maneuver along an original trajectory;

detecting, while performing the driving maneuver, a user input that indicates that a change of direction of travel is to be performed;

effecting, in response to the user input, a change of direction at an intermediate position;

determining, starting from the intermediate position, an adjusted trajectory for the driving maneuver adjusted to the original trajectory; and guiding the motor vehicle in an automated manner to continue the driving maneuver along the adjusted trajectory, wherein the original trajectory leads to an end position of the driving maneuver, the adjusted trajectory, starting from the intermediate position, leads to an adjusted end position, and a distance between the adjusted end position of the adjusted trajectory and the end position of the original trajectory is at most a predefined distance threshold value.

* * * * *